United States Patent [19]

Lazzari

[11] Patent Number: 5,090,111
[45] Date of Patent: Feb. 25, 1992

[54] PROCESS FOR PRODUCING A MAGNETIC RECORDING HEAD

[75] Inventor: Jean-Pierre Lazzari, Corenc, France

[73] Assignee: Commissariat a l'Energie Atomique, Paris, France

[21] Appl. No.: 585,964

[22] Filed: Sep. 21, 1990

[30] Foreign Application Priority Data

Sep. 29, 1989 [FR] France .................. 89 12768

[51] Int. Cl.$^5$ .................................. G11B 5/42
[52] U.S. Cl. ............................ 29/603; 360/119; 427/116; 427/131
[58] Field of Search ............ 29/603; 360/119–121, 360/125, 127; 427/116, 131

[56] References Cited

U.S. PATENT DOCUMENTS

| | | |
|---|---|---|
| 4,399,479 | 8/1983 | Meckel . |
| 4,837,924 | 6/1989 | Lazzari .................. 29/603 |
| 4,900,650 | 2/1990 | Das .................. 29/603 X |

FOREIGN PATENT DOCUMENTS 0262028 3/1988 European Pat. Off. .
0332320 9/1989 European Pat. Off. .

OTHER PUBLICATIONS

IBM Technical Disclosure Bulletin, vol. 17, No. 11, Apr. 1975, Armonk, N.Y. U.S.A. pp. 3446–3449; L. T. Romankiw et al.: "Batch Fabrication of Keyhole Type Magnetic Recording Heads" *Entire Document*.
Patent Abstracts of Japan, vol. 8, No. 252 (P-314) (1689) 17 Nov. 1984, & JP-A-59 121611 (Fujitsu K.K.) 13 Jul. 1984 *Entire Document*.
Patent Abstracts of Japan vol. 9, No. 109 (P-355) (1832) 14 May 1985, * JP-A-59 229724 (Mitsubishi Denki K.K.) 24, Dec. 1984, *Entire Document*.

Primary Examiner—Carl E. Hall
Attorney, Agent, or Firm—Oblon, Spivak, McClelland, Maier & Neustadt

[57] ABSTRACT

A rectangular parallelepiped having a width of approximately 1 micron and a height of several microns and they are separated by an amagnetic spacer.

3 Claims, 3 Drawing Sheets

PROCESS FOR PRODUCING A MAGNETIC RECORDING HEAD

BACKGROUND OF THE INVENTION

1. Field of the Invention

The present invention relates to a process for producing a recording head and to a head obtained by said process. It is used in magnetic recording on supports having a very limited width of approximately 1 micron or less.

2. Background Discussion

The magnetic head according to the invention is of the horizontal, thin film type, such as is e.g. described in EP-A-0 152 326. More particularly, the invention improves a process for the production of such heads known from FR-A-2 604 028 (or its corresponding EP-O 262 028 and U.S. Pat. No. 4,837,924.)

FIG. 1 shows the structure obtained by this process. It is possible to see a generally silicon substrate 10, in which is embedded a lower pole piece 16 formed by electrolytic deposition on an electrode 14, a double conducting coil 20, two magnetic pillars 23,24, each surrounded by a part of the coil, an upper pole piece formed by two flux separators 30,31 separated by a central, amagnetic island 32 and finally two pole pieces 46,48 separated by an amagnetic spacer 42 defining a gap.

The gap width is approximately 20 microns and the thickness of the pole pieces 46,48 is a few microns (FIG. 1 being substantially to scale with respect to the upper part).

Although satisfactory in certain respects, such a magnetic head has certain disadvantages. Firstly, when the width of the track to be read decreases and reaches values equal to or below 1 micron, the magnetization of the magnetic layer in the inoperative state under the effect of the very marked shape anisotropy of the upper pole piece, tends to be oriented parallel to the large dimensions of the pole piece. Therefore the permeability of the pole piece decreases. In addition, the magnetic layer can break up into portions, so that on reading, there is a significant wall noise.

The first of these effects leads to a reduction in the amplitude of the signal and the second to a reduction in the signal-to-noise ratio and are highly prejudicial for the limited track widths, where the reading signal is already intrinsically small.

Another noise increase comes that part of the coil projecting to either side of the upper pole pieces. Although further from the track than the upper piece and only offering a lower resolution than that of the air gap, the lateral portions of the coil still trap a parasitic flux from the tracks adjacent to the track read. This leads to a not completely negligible noise level in view of the small track widths.

SUMMARY OF THE INVENTION

The object of the invention is to obviate these disadvantages. It therefore modifies the production process of the prior art in its final stages, in order to obtain an upper pole piece elongated in its height direction, i.e. it is higher than wide. Thus, the magnetization can more easily turn in the vertical plane, which will reduce the noise level, even for very small track widths (approximately 1 micron or less). The demagnetization fields which could oppose the rotation of the magnetization in the main plane of the pole pieces, remain very weak in this case.

In addition, the magnetic permeability is improved, even though the track width is small.

Furthermore, due to the increase in the cross-section of the pole piece, the relative increase in the height of the pole piece moves the travel plane away from the plane of the coil, which reduces the parasitic noise linked with the adjacent tracks.

finally, there is the elimination of the disadvantage of magnetic heads of unwinding strips where the pole pieces are subject to significant wear, which can be up to a few microns and may expose the lower layers of the head. Even if said wear is not eliminated in the invention, it has no affect on the operation of the head because the thickness of the pole pieces significantly exceeds said wear.

Thus, a first object of the invention is a process for the production of a head for magnetic recording purposes, comprising the following operations:

on a semiconductor substrate, the formation of a lower pole piece, on said lower pole piece, formation of a double conductor coil, at each end of the lower pole piece, the formation of a magnetic pillar, each pillar being surrounded by one of the coils, the formation of the upper pole pieces bearing on the two pillars and having a gap constituted by an amagnetic spacer, characterized in that, for forming the upper pole pieces, the following operations are performed:

on the entity constituted by the lower pole piece, the double coil and the two pillars is deposited a layer of amagnetic material of height H greater than the width TW desired for the air gap and being a few microns, in said amagnetic layer is etched a narrow trench extending from one pillar to the other, said trench having a width of approximately 1 micron equal to the width TW which is desired for the air gap and a height equal to the height H of the amagnetic layer and much greater than the width TW, in the center of said trench and over its entire height is formed an amagnetic spacer, two pole pieces are allowed to grow electrolytically within the trench and on either side of the spacer until they are flush with the amagnetic layer.

The present invention also relates to a magnetic head obtained by this process and which comprises:

on a substrate, a lower pole piece, on said lower pole piece, a double conductor coil, at each end of the lower pole piece, a magnetic pillar, each pillar being surrounded by one of the coils, an upper pole piece bearing on the two pillars and having a gap constituted by an amagnetic spacer, characterized in that the upper pole pieces are shaped like a rectangular parallelepiped having a width TW of approximately 1 micron and a height H much greater than the width T and being several microns, said pieces being separated by an amagnetic spacer defining a gap. TW is preferably between 1 and 10 microns.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
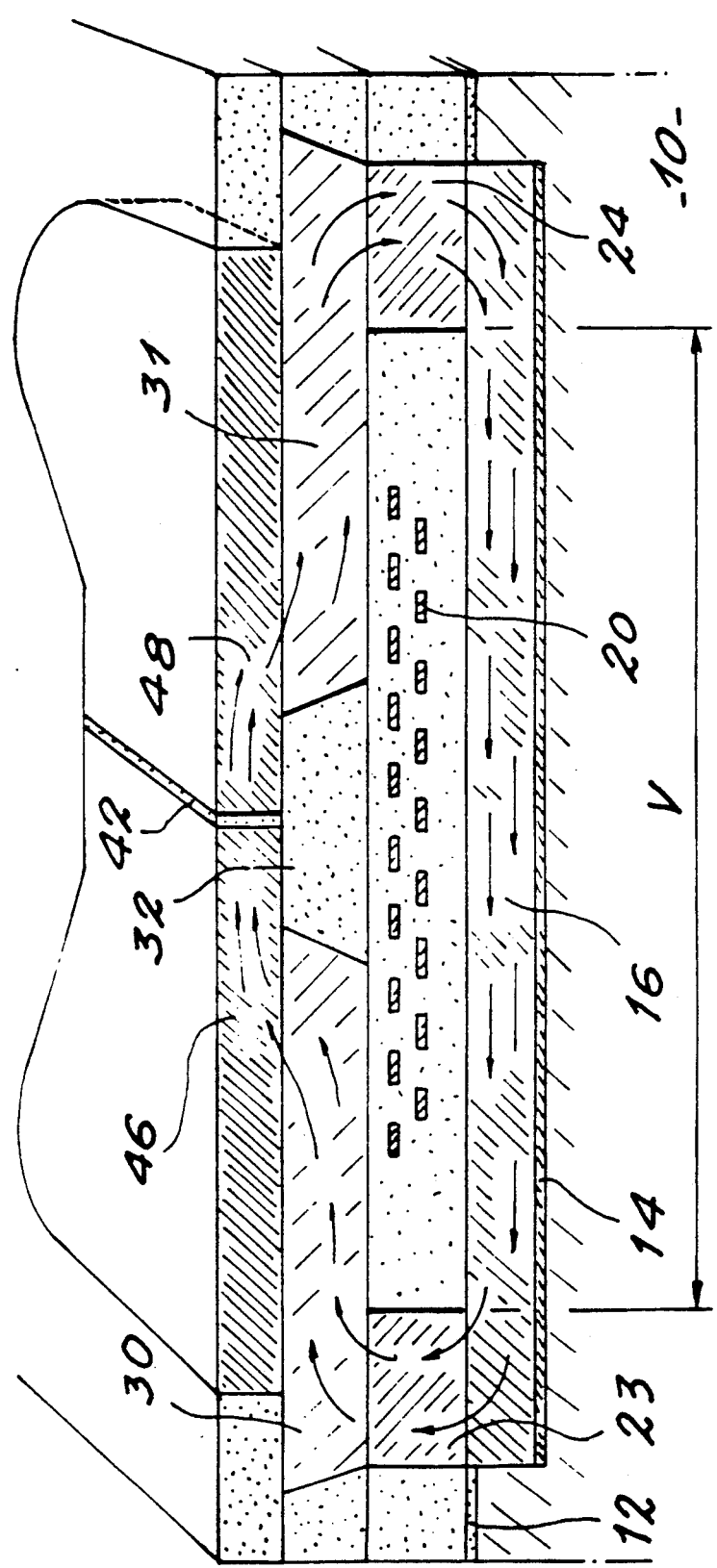
FIG. 1 already described, a prior art magnetic head.

The process according to the invention comprises a certain number of preliminary operations, which are known and described in the aforementioned FR-A-2 604 028 (EP-O 262,028, U.S. Pat. No. 4,837,924), i.e. etching operations, deposition of the conductive layer to form an electrode, electrolytic growth, etc. These preliminary operations, which are known, lead to a component illustrated in part (a) of FIG. 2 and which precisely corresponds to part (i) of FIG. 5 in the aforementioned document. In this component there is a substrate 10, an electrode layer 14, a lower pole piece 16, two pillars 23,24, an insulating layer 18 in which is embedded a coil 20, a central insulating island 32 and two concentrators 30,31 in an insulating layer 26.

The first characteristic operation of the process according to the invention consists of depositing an amagnetic insulating layer 34 (part b). This layer is thick e.g. four to 8 microns thick. It can be of silica or any other wear-resistant material.

Figure 2A:
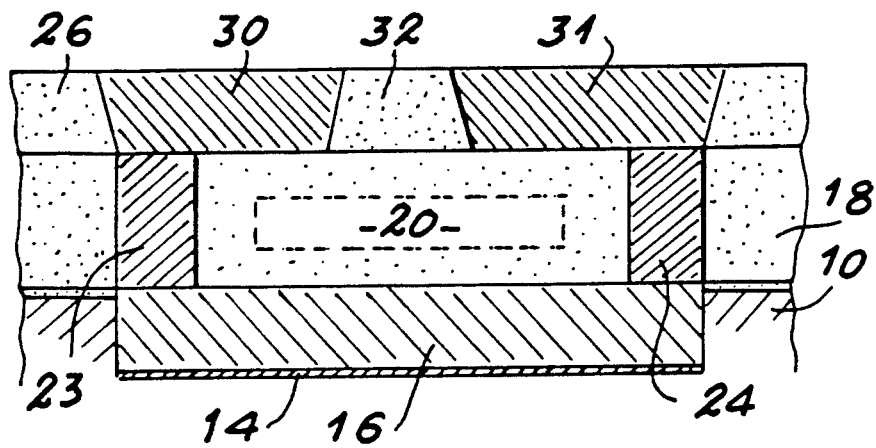
FIGS. 2A-2E show various stages of the production process according to the invention.
Figure 2B:
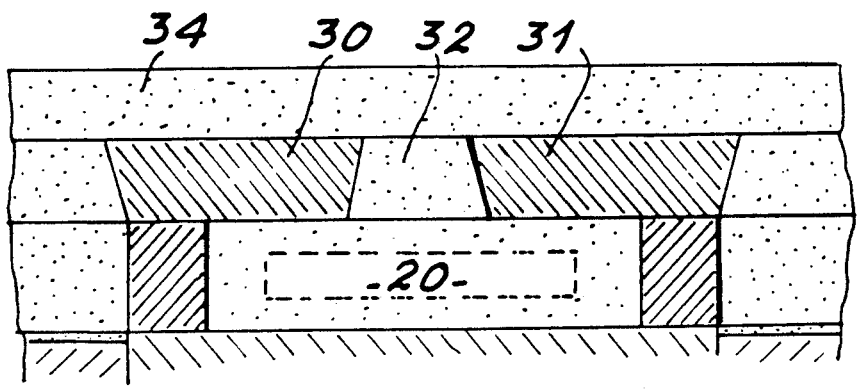
Figure 2C:
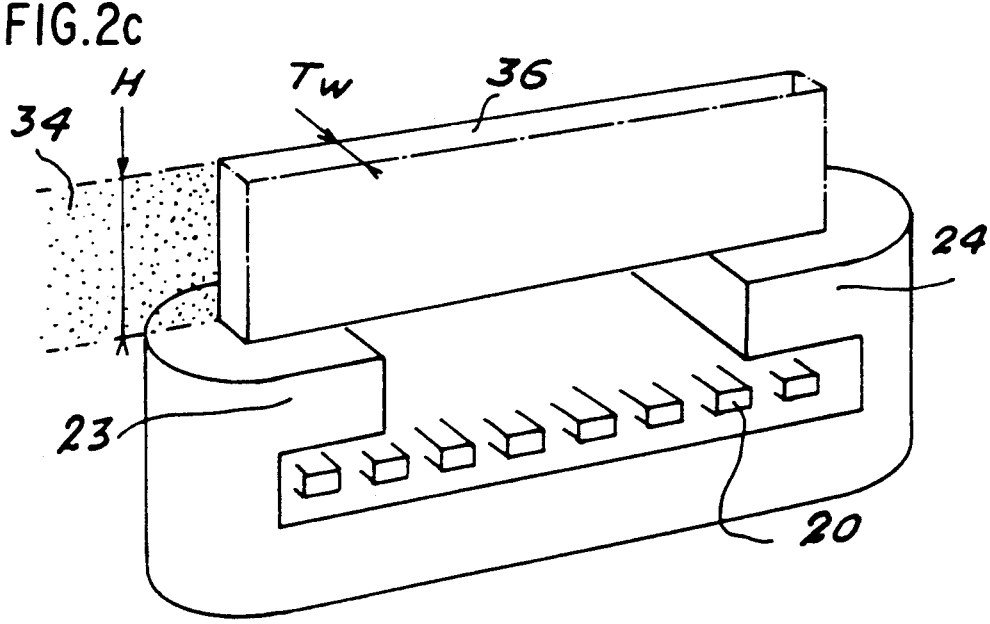
Figure 2D:
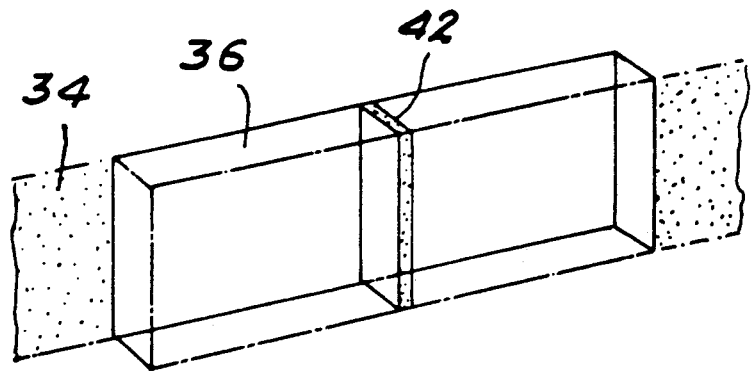

In said amagnetic layer 34 is etched a narrow trench 36 extending from one pillar to the other. The width of said trench is equal to the width of the track to be read. It is in practice approximately 1 micron or less. By construction its height is equal to the height H of the amagnetic layer 34 and therefore greatly exceeds the width TW, e.g. is 8 times the width (FIG. 2c).

In the center of said trench and over its entire height an amagnetic spacer 42 is formed. The means for obtained such a spacer is described in the aforementioned document (FIG. 5, k, l).

Two pole pieces 46,48 are then grown electrolytically within the trench 36 and on either side of the spacer 42. For this purpose the pillars 23,24 are taken as electrodes and deposition takes place beforehand of a conductive layer at the bottom of the trench (FIG. 2e).

The upper pole pieces obtained in this way are shaped like a rectangular parallelepiped having a width of approximately 1 micron and a much greater height of several microns.

The upper pole pieces can be made from the same materials as used for the remainder of the circuit, e.g. iron - nickel.

Figure 2E:
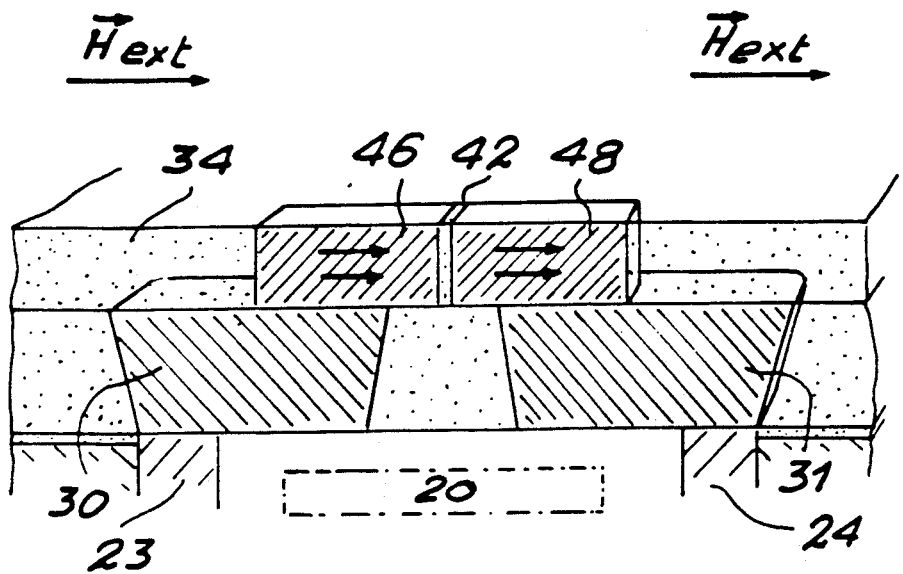

On growing the pole pieces 46,48, to the entity is applied an external magnetic field Hext directed perpendicular to the spacer 42, in order to orient the easy axis of magnetization in the main plane of the pole pieces and as indicated by the arrows in FIG. 2e.

Figure 3:
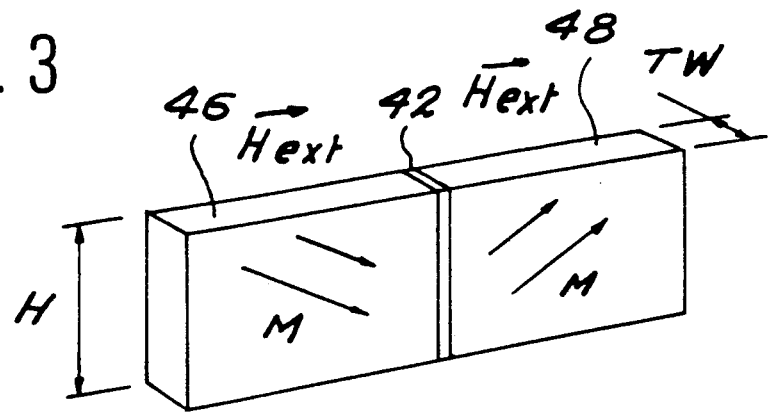
FIG. 3 the configuration of the magnetization in the upper pole pieces.

FIG. 3 shows how this magnetization M can turn in the (vertical) plane (plane which is parallel to the height of the pole piece) under the influence of a field H from the track which has been read. This rotation takes place without any wall noise.

The invention is particularly suitable for the reading and writing of recording supports having a high information density.

We claim:

1. A process for the production of a head for magnetic recording comprising the steps of:
    forming a lower pole piece having first and second extremities on a semiconductor substrate;
    forming a double conductor coil on the lower pole piece;
    forming first and second magnetic pillars respectively at the first and second extremities, each magnetic pillar being surrounded by the coil;
    depositing a layer of an amagnetic material on the lower pole piece, the coil, and the first and second magnetic pillars, the layer of amagnetic material having a height greater than a few microns;
    etching a narrow trench in the layer of amagnetic material extending from the first magnetic pillar to the second magnetic pillar, the trench having a height equal to the height of the layer of amagnetic material, the height of the trench being much greater than a width of the trench;
    forming an amagnetic spacer at a center of the trench, the spacer extending over an entire height of the trench; and electrolytically growing first and second upper pole pieces within the trench so as to respective bear on the first and second pillars and on either side of the amagnetic spacer until said first and second upper pole pieces are flush with an upper surface of the layer of amagnetic material, the first and second upper pole pieces being higher than wide.

2. A process according to claim 1, wherein a magnetic field is applied to the spacer during the electrolytic growing of the first and second upper pole pieces.

3. A process according to claim 1, wherein the layer of amagnetic material has a thickness of between 4 and 6 microns and the trench has a width of approximately 1 micron.

* * * * *